(12) United States Patent
Imao

(10) Patent No.: US 9,519,327 B2
(45) Date of Patent: Dec. 13, 2016

(54) COMMUNICATION APPARATUS AND CONTROL METHOD THEREFOR

(71) Applicant: CANON KABUSHIKI KAISHA, Tokyo (JP)

(72) Inventor: Eiji Imao, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 177 days.

(21) Appl. No.: 14/044,002

(22) Filed: Oct. 2, 2013

(65) Prior Publication Data

US 2014/0108840 A1 Apr. 17, 2014

(30) Foreign Application Priority Data

Oct. 15, 2012 (JP) .................. 2012-228447

(51) Int. Cl.
*G06F 1/26* (2006.01)
*G06F 1/32* (2006.01)

(52) U.S. Cl.
CPC .......... *G06F 1/3209* (2013.01); *G06F 1/3278* (2013.01); *G06F 1/3296* (2013.01); *G06F 1/3203* (2013.01); *Y02B 60/126* (2013.01); *Y02B 60/32* (2013.01)

(58) Field of Classification Search
CPC .................................... G06F 1/3296
USPC .......................................... 713/320
See application file for complete search history.

(56) References Cited

U.S. PATENT DOCUMENTS

| | | | | |
|---|---|---|---|---|
| 7,969,977 B2 | 6/2011 | Imao | ............. | 370/389 |
| 8,356,190 B2 * | 1/2013 | Diab | .............. | H04L 12/12 713/300 |
| 2003/0088796 A1 * | 5/2003 | Abdulkarim | .......... | G06F 1/3203 713/300 |
| 2005/0030808 A1 * | 2/2005 | Brown | ............ | H04L 12/12 365/222 |
| 2009/0119524 A1 * | 5/2009 | Hays | ............... | H04L 12/10 713/322 |
| 2009/0248890 A1 | 10/2009 | Shouno | ............. | 709/232 |
| 2010/0110952 A1 * | 5/2010 | Diab | ................. | H04L 12/12 370/311 |

(Continued)

FOREIGN PATENT DOCUMENTS

| | | |
|---|---|---|
| JP | 2004-243533 A | 2/2004 |
| JP | 2009-239870 A | 9/2006 |

OTHER PUBLICATIONS

IEEE Computer Society, "IEEE Standard for Information technology—Telecommunications and information exchange between systems—Local and metropolitan area networks—Specific requirements", 2010, pp. 1-237.

*Primary Examiner* — Thomas Lee
*Assistant Examiner* — Volvick Derose
(74) *Attorney, Agent, or Firm* — Fitzpatrick, Cella, Harper & Scinto

(57) ABSTRACT

There is provided a communication apparatus in which power consumption by wired connection is reduced in a standby state. An acquisition unit acquires information indicating whether a partner apparatus connected to the communication apparatus by wired connection has a function of waiting in a power saving state in the wired connection. Based on the acquired information, a setting unit sets a communication speed with the partner apparatus. The function of waiting in the power saving state in the wired connection is, for example, LPI (Low Power Idle).

14 Claims, 5 Drawing Sheets

(56) References Cited

U.S. PATENT DOCUMENTS

| | | | |
|---|---|---|---|
| 2010/0226387 A1* | 9/2010 | Thousand | H04L 12/10 370/450 |
| 2010/0262851 A1* | 10/2010 | Chien | H04L 12/12 713/320 |
| 2011/0191608 A1* | 8/2011 | Vetteth | G06F 1/32 713/310 |
| 2013/0031395 A1* | 1/2013 | Yamada | H04L 12/12 713/323 |
| 2014/0149775 A1* | 5/2014 | Ware | G06F 13/14 713/323 |
| 2015/0227489 A1* | 8/2015 | Chen | G06F 13/4291 710/313 |

* cited by examiner

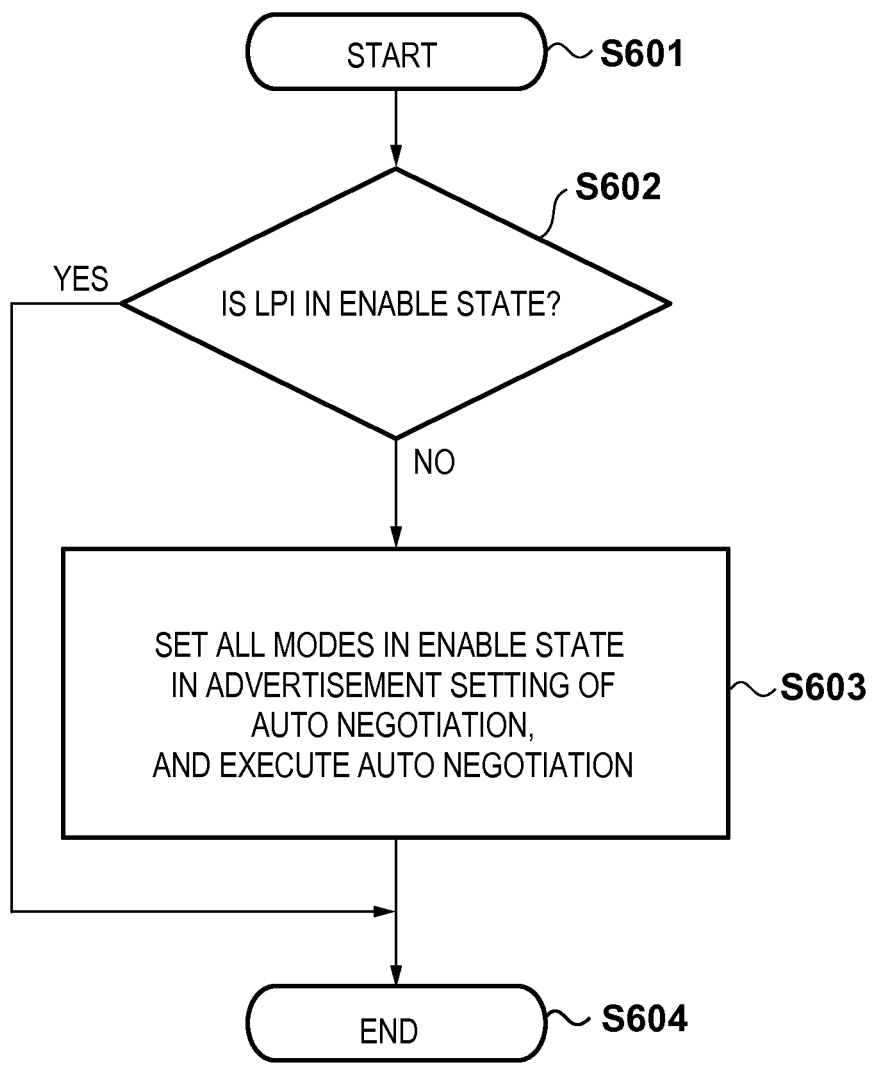

COMMUNICATION APPARATUS AND CONTROL METHOD THEREFOR

BACKGROUND OF THE INVENTION

Field of the Invention

The present invention relates to a power saving control technique in a communication apparatus.

Description of the Related Art

It is well known that in Ethernet® the energy use efficiency is higher as the link speed is higher during data transfer, and the power consumption can be lower as the link speed is lower during an idle state in which no data transfer is performed.

Based on this characteristic, a technique called LPI (Low Power Idle) has been standardized as the EEE (Energy Efficient Ethernet) standard in IEEE802.3az in order to save power in Ethernet. In LPI, the state transits from a normal state to an idle state while there is no frame to be transferred by Ethernet. In the idle state, by powering off unused circuits of a PHY and MAC, it is possible to reduce the power consumption in Ethernet without decreasing the link speed. Since LPI is an optional function of Ethernet, the self apparatus notifies, in auto negotiation upon establishment of a link, a partner apparatus that it is an LPI-capable apparatus. Therefore, as a result of auto negotiation between the self apparatus and the partner apparatus, whether to use LPI is determined in addition to a link speed and duplex.

On the other hand, in order to save power of a communication apparatus for performing communication using Ethernet, there has been conventionally proposed a method of selecting a low link speed in a standby state in which the communication apparatus waits for reception with low power consumption. For example, Japanese Patent Laid-Open No. 2009-239870 discloses a method in which the communication apparatus side determines the communication mode of a network interface apparatus in a state in which the communication apparatus has transited to a power saving mode, and causes the network interface apparatus to set its mode to the determined communication mode. That is, in Japanese Patent Laid-Open No. 2009-239870, power saving is achieved by setting the network interface apparatus so that the link speed in the power saving mode becomes low. Furthermore, Japanese Patent Laid-Open No. 2004-243533 discloses an image forming apparatus for, in a network communication standby state, selecting a mode in which the operating frequency of a PHY is low, and supplying a clock signal. Setting a low operating frequency for a PHY of Ethernet amounts to setting a low link speed.

In a state in which an apparatus for performing network communication by connecting to Ethernet is inactive and is waiting for reception from a network, the apparatus preferably reduces the power consumption as much as possible. If a communication apparatus supports an LPI function and another communication apparatus as a link partner also supports LPI, it is possible to reduce the power consumption while no data transfer is performed. It is, therefore, possible to efficiently obtain the power saving effect in a standby state in which almost no communication is executed.

In auto negotiation, however, a link is established by selecting a maximum one of advertised link speeds at which intercommunication is possible. If, therefore, LPI is not enabled, it is impossible to reduce the power consumption of a network interface. As described above, in the standby state of the communication apparatus, it is possible to save power by selecting a low link speed to set a link mode. On the other hand, however, when the state transits from the normal state to the standby state and when the state transits from the standby state to the normal state, it is necessary to reestablish a communication link. A temporal overhead therefore unwantedly occurs from when a link is established by renegotiation until the apparatus returns to a communicable state after entering a link-up state. Therefore, this is inconvenient if it is desired that the communication apparatus quickly returns from the standby state to the normal state.

SUMMARY OF THE INVENTION

The present invention solves at least one of such problem and other problems. For example, the present invention further reduces the power consumption of a communication apparatus in a standby state. Note that other problems can be understood through this specification.

According to one aspect of the present invention, there is provided a communication apparatus comprising: an acquisition unit configured to acquire information indicating whether a partner apparatus connected to the communication apparatus by wired connection has a function of waiting in a power saving state in the wired connection; and a setting unit configured to set, based on the information acquired by the acquisition unit, a communication speed with the partner apparatus, wherein when the communication apparatus transits from a first state to a second state in which power consumption is lower than that in the first state, the setting unit maintains the communication speed with the partner apparatus if the function is in an enable state, and resets the communication speed if the function is in a disable state.

Further features of the present invention will become apparent from the following description of exemplary embodiments (with reference to the attached drawings).

BRIEF DESCRIPTION OF THE DRAWINGS

FIG. 6 is a flowchart illustrating link mode control processing when the state transits from the power saving standby mode to the normal mode.

DESCRIPTION OF THE EMBODIMENTS

Various exemplary embodiments, features, and aspects of the invention will be described in detail below with reference to the drawings.

A preferred embodiment of the present invention will be explained in detail below with reference to the accompanying drawings. Note that the present invention is not limited to the following embodiment, which is merely a detailed example advantageous for practice of the present invention. In addition, not all the combinations of features described in the following embodiment are essential for the solution to the problem of the present invention.

Figure 1:
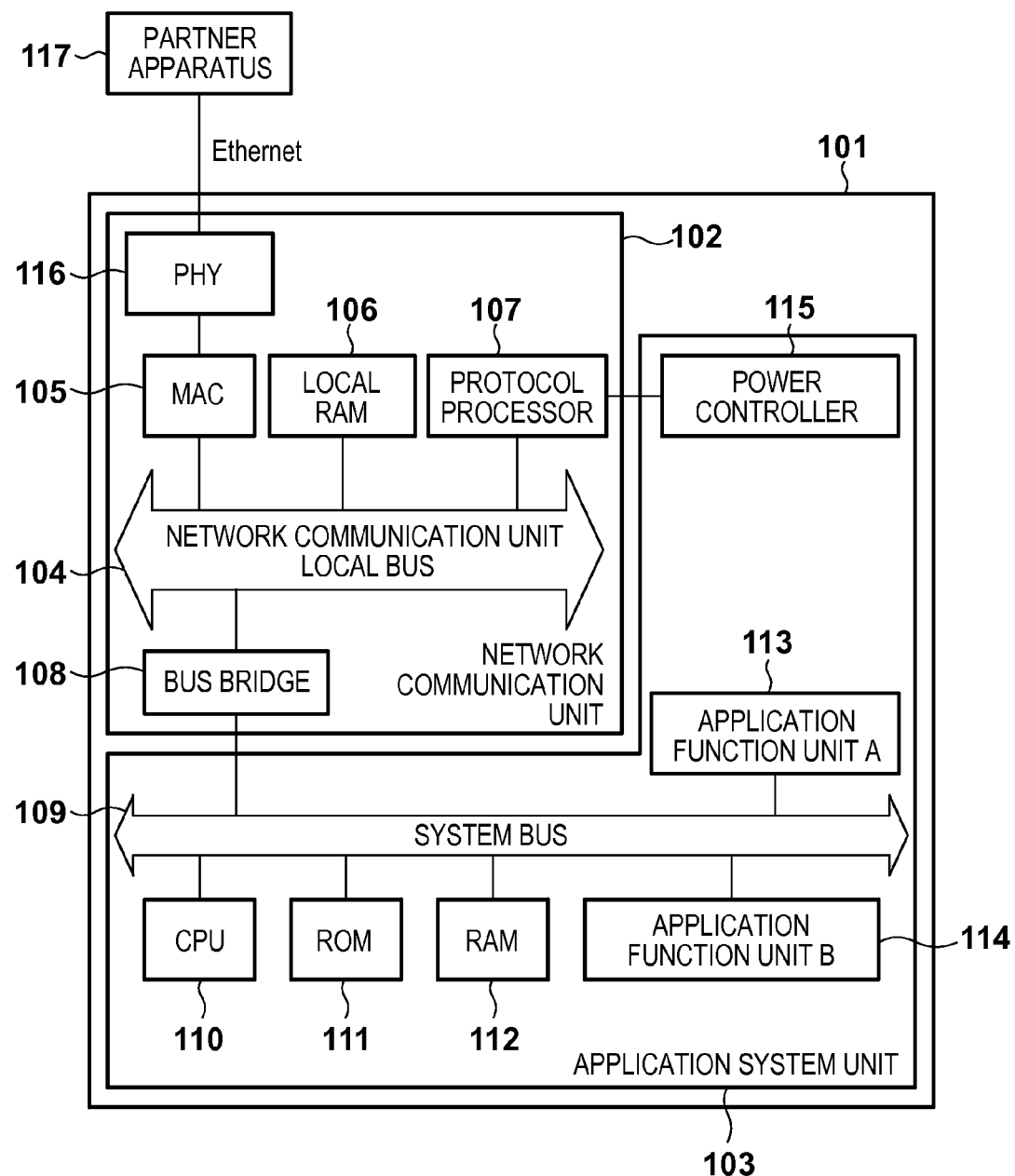
FIG. 1 is a block diagram showing the arrangement of a communication apparatus according to an embodiment.

FIG. 1 is a block diagram showing the arrangement of a communication apparatus 101 according to the embodiment. The communication apparatus 101 includes a network communication unit 102 and application system unit 103 as hardware components. Furthermore, the communication apparatus 101 is physically connected to a partner apparatus 117 by wired connection using Ethernet®. The partner apparatus 117 as a connection destination includes an Ethernet switching hub, or an Ethernet interface such as a router or personal computer.

A MAC (Media Access Controller) 105, a local RAM 106, and a protocol processor 107 are connected to a local bus 104 of the network communication unit 102. The MAC 105 is a controller for link layer processing of Ethernet. The local RAM 106 serves as a temporary storage device for processing within the network communication unit 102. The protocol processor 107 executes TCP/IP communication processing. Furthermore, a PHY (physical layer controller) 116 is connected to the MAC 105. The PHY 116 is physically connected to the partner apparatus 117 by wired connection using a network cable or the like.

The PHY 116 is a controller responsible for physical layer processing of Ethernet. In this embodiment, the PHY 116 can automatically set a communication speed (link speed) of 10 Mbps, 100 Mbps, or 1 Gbps by auto negotiation, and also supports LPI (Low Power Idle). LPI is a function of waiting in a power saving state in wired connection. As described above, LPI is an optional function of Ethernet. Therefore, in auto negotiation upon establishment of a link, the communication apparatus 101 notifies the partner apparatus that it supports LPI. Similarly, the communication apparatus 101 acquires, from the partner apparatus connected to the communication apparatus 101 by wired connection, information indicating whether the partner apparatus has LPI. The PHY 116 and MAC 105 are connected to each other by a bus interface such as GMII or RGMII standardized in IEEE802.3, and an MDC/MDIO interface for controlling between the PHY 116 and the MAC 105.

The network communication unit 102 implements a communication function using the TCP/IP protocol. A communication frame is transmitted/received through the MAC 105 and PHY 116 via a network on the side of the partner apparatus 117.

The protocol processor 107 is a hardware circuit apparatus dedicated for communication protocol processing, or a microprocessor designed for communication protocol processing, and executes general-purpose TCP/IP protocol communication processing. More specifically, the protocol processor 107 performs communication protocol processing of the IPv4 (IP version 4), IPv6 (IP version 6), ICMP, UDP, or TCP protocol, transmission flow control, congestion control, communication error control, and the like. The protocol processor 107 is connected to a power controller 115 by a control signal line, and controls the operation of the power controller 115.

The local RAM 106 is used as a temporary storage area for data in processing by the MAC 105 or protocol processor 107. If the protocol processor 107 is a microprocessor, the local RAM 106 is used as a buffer for storing programs.

The network communication unit 102 includes a bus bridge circuit 108 which allows data transfer between the local bus 104 and a system bus 109 of the application system unit 103. That is, the bus circuit of the network communication unit 102 and that of the application system unit 103 are interconnected, and transfer between the buses is performed in input/output of communication data.

A CPU 110, a ROM 111 storing a system program, and a RAM 112 serving as a temporary storage device used in execution of the system program are connected to the system bus 109 of the application system unit 103. Note that the system program is loaded from the ROM 111 into the RAM 112, and is then executed by the CPU 110.

Furthermore, an application function unit A 113 and application function unit B 114 connected to the system bus 109 are hardware accelerators used to implement a characteristic application function of the communication apparatus 101.

The power controller 115 individually controls power supply to the network communication unit 102 and that to the application system unit 103. The power controller 115 performs, for each of the components 109 to 114, power-on control, hardware reset control, control for instructing to start stop processing to safely power off the entire application system unit 103, and the like.

The CPU 110 controls each hardware component of the communication apparatus 101, and executes application processing based on the system program. The RAM 112 has a temporary storage area to be used by the CPU 110 to execute a program, and an input/output data area to be used by the network communication unit 102 and the application function units 113 and 114.

The application system unit 103 implements the application function of the communication apparatus 101. The system program executed by the CPU 110 performs application communication which is part of the application function. The application communication is based on the TCP/IP protocol, and TCP/IP protocol processing is executed by the network communication unit 102.

Figure 4:
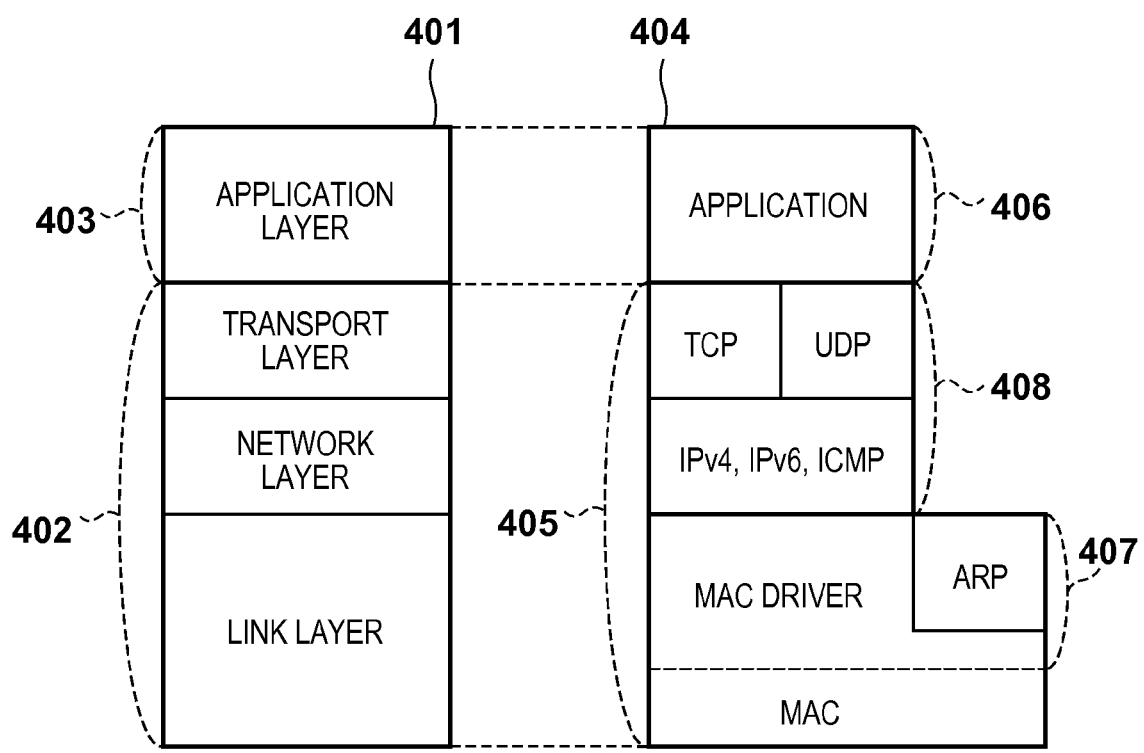
FIG. 4 is a view showing function sharing of communication processing by the communication apparatus according to the embodiment.

Such function sharing of the communication processing will be described with reference to FIG. 4. In FIG. 4, reference numeral 401 denotes the hierarchical model of the TCP/IP protocol, which includes four layers: a link layer, a network layer, a transport layer, and an application layer 403 from the bottom. A protocol in the link layer is the communication protocol of a physical network such as Ethernet in a general wired LAN, a wireless LAN standardized in IEEE802.11b/a/g/n or the like. Examples of a protocol in the network layer are IPv4, IPv6, ICMP, and IGMP protocols. Examples of a protocol in the transport layer are UDP and TCP protocols. HTTP, FTP, SMTP, and RTP protocols and the like which are application protocols generally used in the Internet are used in the application layer 403. Communication using an application layer protocol specifically defined is often performed in TCP/IP.

The network communication unit 102 implements protocol processing in the link layer, network layer, and transport layer within a range 402. In application communication executed by the application system unit 103, protocol processing in the application layer 403 is performed.

In FIG. 4, reference numeral 405 denotes a range which hierarchically represents communication processing executed by the communication apparatus 101 in correspondence with the hierarchical model 401 of the TCP/IP protocol. The network communication unit 102 executes processing within the range 405 of FIG. 4. The protocol processor 107 executes processing within a range 407 within this range, that is, the following two processes:

MAC driver: a driver for controlling the MAC 105; and

ARP: processing of an ARP protocol used to solve the correspondence between an IP address and a MAC address.

The protocol processor 107 executes processing within a range 408, that is, processing of the IPv4, IPv6, or ICMP protocol as a network layer protocol, and processes of the UDP and TCP protocols as transport layer protocols.

On the other hand, the application system unit 103 executes processing that falls within a range 406, and indicates all application layer protocol processes used in application communication of the communication apparatus 101.

With TCP/IP communication sharing processing 404, the application system unit 103 implements application communication of the communication apparatus 101 using the communication function of the network communication unit 102.

In the above-described arrangement, while the communication apparatus 101 executes an application to perform communication, at least the network communication unit 102, system bus 109, CPU 110, ROM 111, RAM 112, and power controller 115 are in operation. A power consumption state at this time will be referred to as a "normal mode" in terms of power consumption. In the normal mode, the power consumption rises when the application function unit A 113 or application function unit B 114 of the application system unit 103 operates, and the power consumption reduces when neither of the units operates. As described above, the power controller 115 controls power supply to the hardware components 109 to 114 of the application system unit 103.

On the other hand, while the communication apparatus 101 does not execute any application, it powers off the hardware components 109 to 114 of the application system unit 103, thereby stopping the operation. The communication apparatus 101 operates only the network communication unit 102 and power controller 115. This enables the communication apparatus 101 to largely reduce the power consumption. This operation state with low power consumption will be referred to as a "power saving standby mode".

Figure 2:
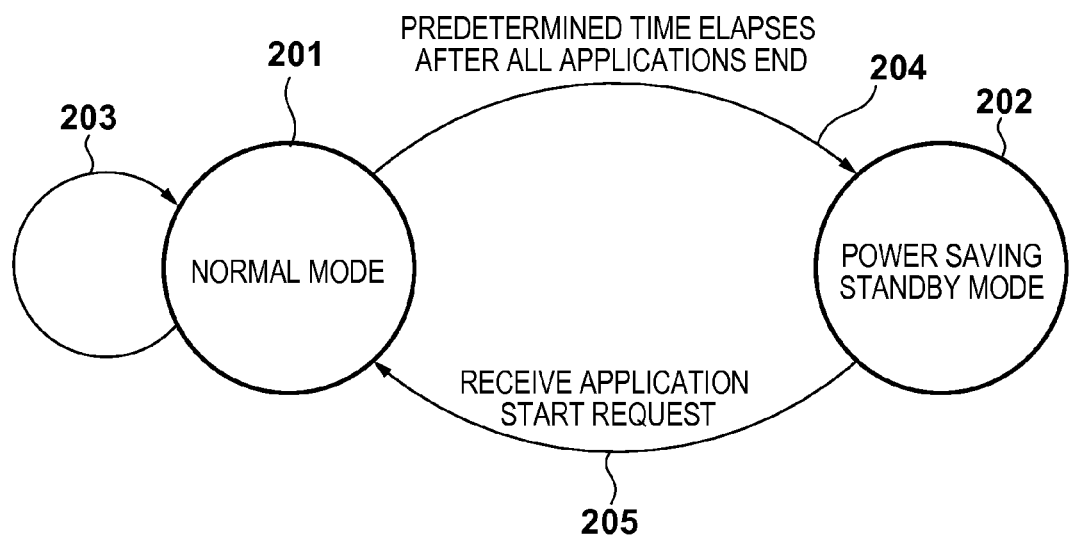
FIG. 2 is a view showing transition of the communication apparatus between a normal mode and the power saving standby mode according to the embodiment.

FIG. 2 is a view showing state transition of the communication apparatus 101 between the normal mode and the power saving standby mode. Reference numeral 201 denotes a normal mode; and 202, a power saving standby mode. In the normal mode, during execution of an application, the normal mode is maintained (203). In the normal mode, when a predetermined time elapses after all applications end, the state transits to the power saving standby mode 202 (204). In addition, if no application is executed within a predetermined time after initial start processing performed when the communication apparatus 101 is first powered on, the state also transits to the power saving standby mode 202. On the other hand, in the power saving standby mode 202, if an application start request is received, the state transits to the normal mode 201 (205).

Figure 3:
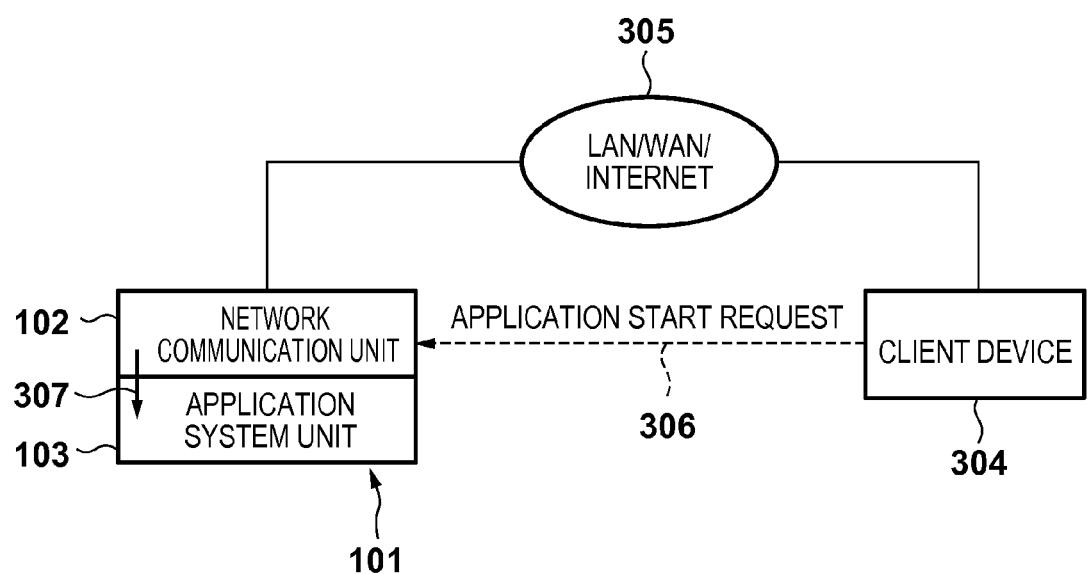
FIG. 3 is a view showing a schematic operation when the communication apparatus receives an application communication start request in the power saving standby mode.

A schematic operation when the communication apparatus 101 receives an application start request from a client device or the like while operating in the power saving standby mode will be described with reference to FIG. 3.

The user of the communication apparatus 101 is represented by a client device 304, and a network 305 exists between the communication apparatus 101 and the client device 304. The network 305 can be a LAN, a WAN, or the Internet.

The client device 304 as a user transmits an application start request 306 to the communication apparatus 101 serving as a server apparatus. The network communication unit 102 of the communication apparatus 101 receives the application start request 306. Upon receiving the application start request 306, the network communication unit 102 turns on the power of the application system unit 103 (307).

As described above, the communication apparatus 101 operates while switching between the normal mode in which an application is executed and the power saving standby mode in which the communication apparatus 101 reduces the power consumption and waits.

Link mode control of Ethernet with the partner apparatus 117 in the power saving standby mode of the communication apparatus 101 will be described. Note that link mode control is executed by the protocol processor 107 of the network communication unit 102. The protocol processor 107 executes driver processing by the MAC 105, as described above. The MAC 105 can check the state of the PHY 116, make link settings, or execute an operation by register access.

Processing of detecting a change in state of wired connection (a change in link state) during an operation in the power saving standby mode will be described first. A change in link state is detected when the link state changes to a link-down state due to an event in which, for example, a network cable is pulled out from the communication apparatus 101 or the power of the partner apparatus is turned off. Furthermore, a change in link state is also detected when the state changes from a link-down state to a link-up state due to an event in which, for example, a network cable is inserted in the communication apparatus 101. If the link state of the PHY 116 changes, the PHY 116 asserts an interrupt signal to the protocol processor 107 via the MAC 105. This causes the protocol processor 107 to detect the change in link state. The protocol processor 107 may detect a change in link state by monitoring the state of the PHY 116 by register access by the MAC 105.

Link mode control processing when the protocol processor 107 detects a change in link state will be described next with reference to a flowchart shown in FIG. 5.

Figure 5:
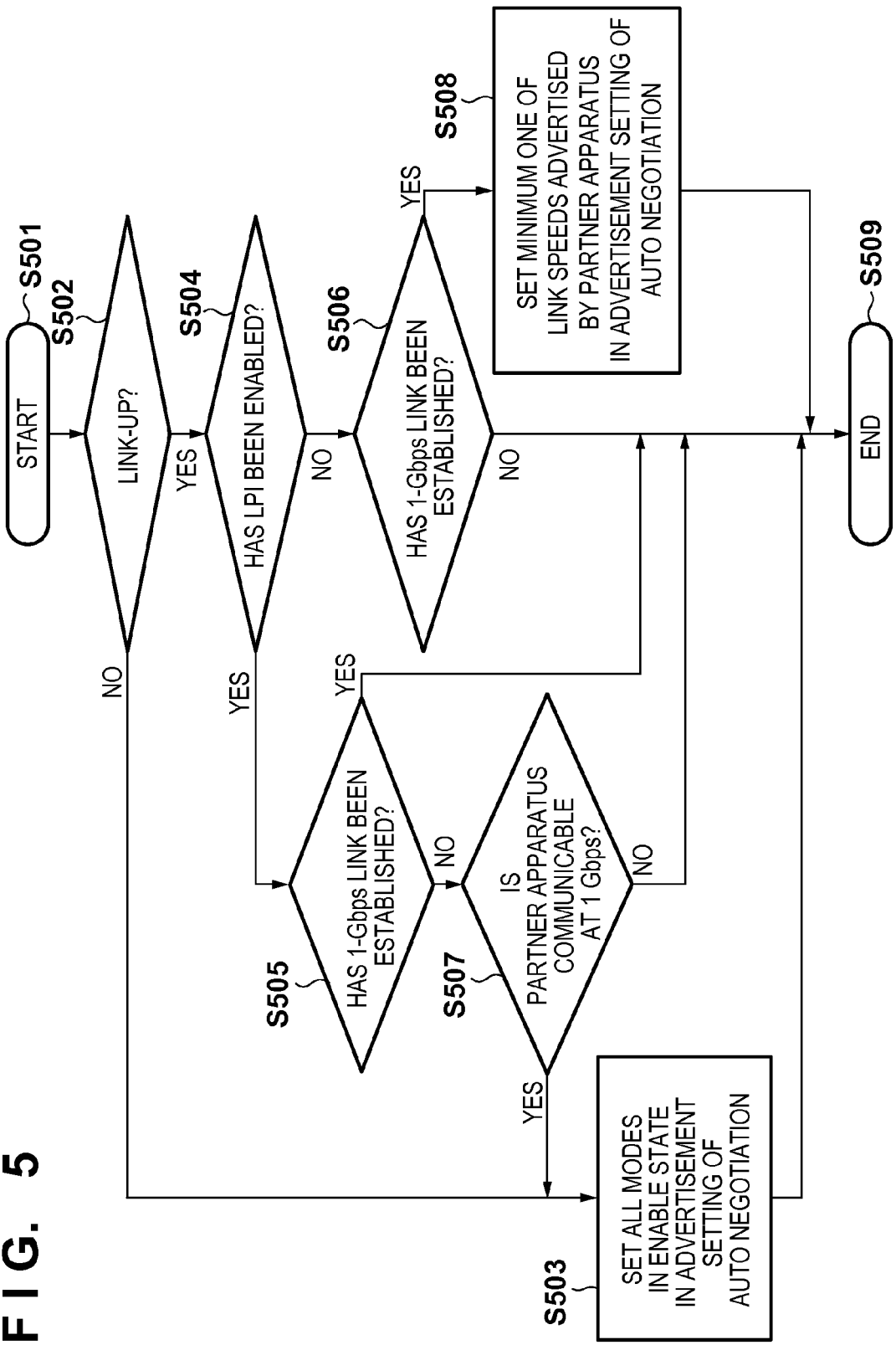
FIG. 5 is a flowchart illustrating link mode control processing when a change in link state is detected in the power saving standby mode.

The process starts from step S501 of FIG. 5. In step S502, the protocol processor 107 checks whether the state has changed to a link-up state or link-down state. If the state has changed to a link-down state, the process advances to step S503, in which the protocol processor 107 sets, in an enable state, all link modes to be advertised in auto negotiation. In this embodiment, the PHY 116 supports link speeds of 10 Mbps/100 Mbps/1 Gbps. In step S503, therefore, the unit 107 enables the three link speeds, full-duplex/half-duplex for duplex, and LPI. The processing in step S503 is executed to advertise, in next auto negotiation, that all the modes are in an enable state. The process advances from step S503 to step S509, and then ends.

On the other hand, if it is checked in step S502 that the link state has changed to a link-up state, the process advances to step S504. In step S504, the protocol processor 107 checks whether LPI has been enabled in the PHY 116. If LPI has been enabled, the process advances to step S505; otherwise, the process advance to step S506.

In step S505, the protocol processor 107 checks whether the link state indicates that a 1-Gbps link has been established. If a 1-Gbps link has been established, the state in which LPI is in an enable state and the 1-Gbps link has been established is maintained. The process then advances to step S509 without setting a link mode, and ends. If, in step S505, the link state indicates that no 1-Gbps link has been established, a link has been established at a link speed of 10 Mbps or 100 Mbps. In this case, the process advances to step S507.

In step S507, the protocol processor 107 checks whether the partner apparatus 117 has advertised a link speed of 1 Gbps in auto negotiation. It is possible to check capability such as link speeds advertised by the partner apparatus 117 when the MAC 105 reads out data from the internal register of the PHY 116 via the MDIO interface. If it is checked in step S507 that the partner apparatus 117 is communicable at a link speed of 1 Gbps, the process advances to step S503. The processing in step S503 is as described above, and the process advances to step S509 after the processing in step S503, and then ends. If the process advances from step S507 to step S503, auto negotiation is re-executed in the PHY 116 after the processing in step S503. If the partner apparatus 117 cannot perform communication at a link speed of 1 Gbps, a state in which a link has been established at a link speed of 10 Mbps or 100 Mbps is maintained. In this case, the process advances from step S507 to step S509, and then ends without setting a link mode. In this way, if a change in link state is detected and LPI has been enabled, a maximum speed at which communication can be performed with the partner apparatus is set.

If the process advances from step S504 to step S506, LPI has been disabled. In step S506, the protocol processor 107 checks whether the link state indicates that a 1-Gbps link has been established. If a 1-Gbps link has been established, the process advances to step S508; otherwise, the process advances to step S509, and then ends without setting a link mode.

If the process advances to step S508, LPI has been disabled and the 1-Gbps link has been established. In step S508, the protocol processor 107 sets a link mode to have a minimum one of speeds advertised by the partner apparatus 117 in auto negotiation. If the link mode is set in step S508, the PHY 116 re-executes auto negotiation.

The link mode control processing when the communication apparatus 101 detects a change in link state of Ethernet during operation in the power saving standby mode has been described above with reference to FIG. 5. With this control processing, if the link state changes in the power saving standby mode, and the state changes to a link-up state while LPI is in an enable state, it is controlled to preferentially establish a link at a maximum one of link speeds at which communication can be performed between the communication apparatus 101 and the partner apparatus 117. In the power saving standby state, an attempt is made to save power by LPI, and it is not necessary to change the link state when the mode transits from the power saving standby mode to the normal mode. On the other hand, if LPI is in a disable state and the link state changes to a link-up state in the power saving standby mode, it is controlled to establish a link at a minimum one of the link speeds between the communication apparatus 101 and the partner apparatus 117 in order to save power. This can reduce the power consumption in a standby state. When the mode transits from the normal mode to the power saving standby mode, it is possible to set a link mode in the power saving standby mode based on the link state in the normal mode by executing link mode control according to the processing shown in the flowchart of FIG. 5.

Link mode control when the mode transits from the power saving standby mode to the normal mode will be described with reference to a flowchart shown in FIG. 6. Note that it is assumed that Ethernet between the communication apparatus 101 and the partner apparatus 117 is already in a link-up state.

The process starts from step S601 of FIG. 6. In step S602, the protocol processor 107 checks whether LPI is in an enable state. If LPI is in an enable state, the process advances from step S602 to step S604, and then ends. As described above, Ethernet is in the link-up state at a maximum link speed in the power saving standby mode. The current link state is, therefore, maintained without executing link mode control processing. If it is checked in step S602 that LPI is in a disable state, a minimum link speed has been set between the communication apparatus 101 and the partner apparatus 117 in the power saving state. Therefore, the protocol processor 107 resets a link mode to advertise, in auto negotiation, that all the modes are in an enable state, and re-executes auto negotiation, thereby terminating the process. Upon completion of auto negotiation, a link is established in the normal state at a maximum link speed at which communication can be performed between the communication apparatus 101 and the partner apparatus 117.

The embodiment of the present invention has been explained above. According to the above-described embodiment, in the normal state in which the communication apparatus 101 is active, the communication apparatus 101 links to the partner apparatus 117 at a maximum valid link speed. On the other hand, in the power saving standby mode, the communication apparatus 101 can control to prioritize a high link speed if LPI is in an enable state, and establish a link at a low link speed if LPI is in a disable state. Only if LPI is in a disable state, the communication apparatus 101 controls to set a low link speed in the power saving standby mode. If, therefore, LPI is in an enable state, the link state can be maintained when returning from the power saving standby mode to the normal mode, thereby eliminating a time loss until a link is established, due to a change in link mode.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-228447, filed Oct. 15, 2012, which is hereby incorporated by reference herein in its entirety.

What is claimed is:

1. A communication apparatus comprising:
an acquisition unit configured to acquire information indicating whether a partner apparatus connected to the communication apparatus by wired connection has a predetermined function of waiting in a power saving state in the wired connection;
a setting unit configured to set a communication speed with the partner apparatus in a case where the communication apparatus is in a first state based on the information acquired by the acquisition unit;
a determination unit configured to determine whether or not the partner apparatus has the predetermined function, in a case where the communication apparatus transits from the first state into a second state that requires more power consumption than the first state; and
a resetting unit configured to execute a reset process of the communication speed with the partner apparatus, in a case where it is determined that the partner apparatus does not have the predetermined function, wherein the communication apparatus maintains, in the second state, the communication speed set by the setting unit in the first state without executing the reset process by the resetting unit, in a case where it is determined that the partner apparatus has the predetermined function.

2. The apparatus according to claim 1, wherein the predetermined function is LPI (Low Power Idle).

3. The apparatus according to claim 2, further comprising a detection unit configured to detect a change in state of the wired connection with the partner apparatus, wherein when the detection unit detects the change in state, the setting unit sets the communication speed with the partner apparatus.

4. The apparatus according to claim 3, wherein when the detection unit detects the change in a case where the communication apparatus is in the first state and the predetermined function has been enabled, the setting unit sets the communication speed to a maximum speed at which communication with the partner apparatus is possible.

5. The apparatus according to claim 3, wherein when the detection unit detects the change in a case where the communication apparatus is in the first state and the predetermined function has been disabled, the setting unit sets the communication speed to a minimum speed at which communication with the partner apparatus is possible.

6. A method of controlling a communication apparatus, comprising the steps of:

acquiring information indicating whether a partner apparatus connected to the communication apparatus by wired connection has a predetermined function of waiting in a power saving state in the wired connection;

setting a communication speed with the partner apparatus in a case where the communication apparatus is in a first state based on the information acquired by the acquisition unit;

determining whether or not the partner apparatus has the predetermined function, in a case where the communication apparatus transits from the first state into a second state that requires more power consumption than the first state; and resetting a communication speed with the partner apparatus, in a case where it is determined that the partner apparatus does not have the predetermined function; and maintaining, in the second state, the communication speed set by the setting unit in the first state without executing the reset process by the resetting unit, in a case where it is determined that the partner apparatus has the predetermined function.

7. A non-transitory computer-readable storage medium storing a program for causing a computer to perform a method of a communication apparatus, the method comprising:

acquiring information indicating whether a partner apparatus connected to the communication apparatus by wired connection has a predetermined function of waiting in a power saving state in the wired connection;

setting a communication speed with the partner apparatus in a case where the communication apparatus is in a first state based on the information acquired by the acquisition unit;

determining whether or not the partner apparatus has the predetermined function, in a case where the communication apparatus transits from the first state into a second state that requires more power consumption than the first state; and resetting a communication speed with the partner apparatus, in a case where it is determined that the partner apparatus does not have the predetermined function; and maintaining, in the second state, the communication speed set by the setting unit in the first state without executing the reset process by the resetting unit, in a case where it is determined that the partner apparatus has the predetermined function.

8. A communication apparatus comprising:

an acquisition unit configured to acquire information indicating whether a partner apparatus connected to the communication apparatus by wired connection has a predetermined function of waiting in a power saving state in the wired connection;

a setting unit configured to set a communication speed with the partner apparatus in a case where the communication apparatus is in a first state based on the information acquired by the acquisition unit;

a determination unit configured to determine whether or not the partner apparatus has the predetermined function; and a resetting unit configured to execute a reset process of the communication speed with the partner apparatus when the communication apparatus transits from the first state into a second state that requires more power consumption than the first state, in a case where it is determined that the partner apparatus does not have the predetermined function, wherein the communication apparatus maintains, in the second state, the communication speed set by the setting unit in the first state without executing the reset process by the resetting unit when the communication apparatus transits from the first state into the second state, in a case where it is determined that the partner apparatus has the predetermined function.

9. The apparatus according to claim 8, wherein the predetermined function is LPI (Low Power Idle).

10. The apparatus according to claim 8, further comprising a detection unit configured to detect a change in state of the wired connection with the partner apparatus, wherein when the detection unit detects the change in state, the setting unit sets the communication speed with the partner apparatus.

11. The apparatus according to claim 8, wherein when the detection unit detects the change in a case where the communication apparatus is in the first state and the predetermined function has been enabled, the setting unit sets the communication speed to a maximum speed at which communication with the partner apparatus is possible.

12. The apparatus according to claim 8, wherein when the detection unit detects the change in a case where the communication apparatus is in the first state and the predetermined function has been disabled, the setting unit sets the communication speed to a minimum speed at which communication with the partner apparatus is possible.

13. A communication method for a communication apparatus, the method comprising:

acquiring information indicating whether a partner apparatus connected to the communication apparatus by wired connection has a predetermined function of waiting in a power saving state in the wired connection;

setting a communication speed with the partner apparatus in a case where the communication apparatus is in a first state based on the information acquired by the acquiring;

determining whether or not the partner apparatus has the predetermined function; and executing a reset process of the communication speed with the partner apparatus when the communication apparatus transits from the first state into a second state that requires more power consumption than the first state, in a case where it is determined that the partner apparatus does not have the predetermined function, wherein the communication apparatus maintains, in the second state, the communication speed set by the setting in the first state without executing the reset process when the communication apparatus transits from the first state into the second state, in a case where it is determined that the partner apparatus has the predetermined function.

14. A non-transitory computer-readable storage medium storing a program for causing a computer to perform a method of a communication apparatus, the method comprising:

acquiring information indicating whether a partner apparatus connected to the communication apparatus by wired connection has a predetermined function of waiting in a power saving state in the wired connection;

setting a communication speed with the partner apparatus in a case where the communication apparatus is in a first state based on the information acquired by the acquiring;

determining whether or not the partner apparatus has the predetermined function; and executing a reset process of the communication speed with the partner apparatus when the communication apparatus transits from the first state into a second state that requires more power consumption than the first state, in a case where it is determined that the partner apparatus does not have the predetermined function, wherein the communication apparatus maintains, in the second state, the communication speed set by the setting in the first state without executing the reset process when the communication apparatus transits from the first state into the second state, in a case where it is determined that the partner apparatus has the predetermined function.

\* \* \* \* \*